Patented Nov. 28, 1933

1,936,586

UNITED STATES PATENT OFFICE 1,936,586

MANUFACTURE OF CELLULOSE ESTERS

Henry Dreyfus, London, England

No Drawing. Application November 24, 1928, Serial No. 321,750, and in Great Britain December 17, 1927

16 Claims. (Cl. 260—101)

This invention relates to a new or improved process for the manufacture of cellulose acetates and cellulose esters of higher homologues of acetic acid, for example of propionic acid or butyric acid.

In the specification of my previous British patent application No. 25,637 of 1927 dated 28th September 1927, I have described inter alia how cellulose esters of high quality may be produced by subjecting cellulosic materials, with or without pretreatment with organic acids, especially lower aliphatic acids such as formic or acetic acid, to esterification by means of fatty acid anhydrides, particularly acetic anhydride, in presence of a condensing agent or catalyst comprising both a ferric halide and a hydrohalic acid and particularly in presence of ferric chloride and hydrochloric acid, each being present in a quantity of not less than 2% calculated on the weight of the cellulose, and preferably in the proportion of 5-10% on the cellulose.

As stated in my said previous specification it is possible by the processes therein described to obtain valuable cellulose acetates and other cellulose esters, and in particular to obtain clear esterification solutions of same without serious degradation of the cellulose molecule.

I have now found that exceedingly good results may be obtained by employing ferric halide and more particularly ferric chloride without the hydrohalic acid, provided that the cellulose or cellulosic material be pretreated with organic acids, especially lower fatty acids such as formic acid or acetic acid.

According to the present invention therefore, cellulose esters are produced by subjecting cellulosic materials to a pretreatment with organic acids, particularly lower aliphatic acids such as formic or acetic acid, and then to esterification by means of fatty acid anhydrides, particularly acetic anhydride, in presence of a ferric halide and particularly ferric chloride.

Ferric chloride is of course a known condensing agent in the esterification of ordinary cellulose, but it is found either that its use results in esterification products which are by no means free from fibre and consequently constitute very unsatisfactory esterification products, or, if sufficiently high temperatures are employed to obtain complete esterification e. g. to obtain clear solutions (and this is exceedingly difficult even with high temperatures), that serious degradation of the cellulose sets in, attended by a corresponding loss in the valuable properties of the esters obtained, such as in the viscosity characteristics.

As the result of research I have found that clear esterification solutions are obtained without serious degradation of the cellulose molecule by pretreating the cellulosic material with formic or acetic or other organic acid and subsequently esterifying in presence of ferric chloride. With suitable quantities of ferric chloride, the reaction may take place even in the cold or at lower temperatures.

This result is the more remarkable if one considers that zinc chloride will not give the required results in the absence of hydrochloric acid.

I have further found that valuable results may also be obtained by employing, wholly or partly in place of ferric chloride, ferric bromide or ferric iodide or mixtures thereof.

The reaction time will depend both upon the quantity of ferric chloride or other halide used and upon the temperature employed. With small quantities of ferric chloride, such as 2-3% calculated on the cellulose, the acetylation or other esterification takes a considerable time when conducted at temperatures which do not bring about serious degradation of the cellulose, and from the point of view of accelerating the reaction and decreasing the time it is better to increase the quantity of ferric chloride to over 5% for example 10% or more. The best results appear to be obtained when the ferric chloride is present in proportions of 10-30%, but the quantity may be increased to 40% or 50% or more. It is however preferable not to increase it beyond 50%.

As initial materials for acetylation or esterification cotton or other celluloses or near conversion products thereof or other cellulosic materials may be employed. Wood pulps, such as sulphite pulp, soda pulp, sulphate pulp or mechanical wood pulps, or bamboo, esparto or other materials containing encrusting matter and from which the lignin, pentosan, resin and like constituents have been substantially removed, may be employed, but are preferably subjected, prior to the treatment with organic acids, to an alkaline purifying treatment as described in my U. S. Patent 1,711,110 granted April 30, 1929. For example the alkaline purifying treatment may be performed with caustic alkali of low concentration, such as 3% or under, with heating or boiling, or with caustic alkali of high concentration, such as 5-10% or more, in the cold or with only slight heating. The invention further contemplates the acetylation or other esterification of already esterified products and of cellulose ethers.

The pretreatment of the cellulosic materials with organic acids may be carried out in any suitable manner. Thus, for example, they may be pretreated with the concentrated or dilute acids, particularly formic or acetic acid, as described in my French Specification No. 565,654 or, as described in my U. S. Patent application Serial No. 66,103, filed 31st October 1925, with the vapours of the acids, the vapours being employed alone or mixed with air or other inert gas and being applied as such or being generated by first soaking the cellulosic material in dilute or concentrated solutions of the acids and then blowing or sucking air or other inert gas over or through the material. After the treatment with organic acids, the cellulosic materials may be subjected to a stream of air or inert gas or to suction or vacuum to remove the organic acids wholly or partially. Formic acid, except when employed only in small quantities, should be substantially removed as it reacts with acetic anhydride. I have found that the best results are obtained if the cellulosic material be pretreated with formic acid, such as 80-100% formic acid, or with a mixture of formic acid and acetic acid.

In order to avoid degradation of the cellulose molecule the acetylation or other esterification is preferably carried out at temperatures not exceeding 50° C. The most valuable esters are obtained if the esterification is performed at low temperatures, for example below atmospheric, e. g. 10° C. to 5° or 0° C. or lower, at ordinary temperatures or at temperatures, such as 20° to 30° C. not substantially above atmospheric.

The ferric salt may be employed as such or may be formed in situ. For example ferric oxide may be used and on addition of hydrochloric acid form the required ferric chloride. The catalyst if desired, may be incorporated in the cellulosic material prior to the acetylation or esterification. This may conveniently be performed by dissolving it in the acid used for the pretreatment.

The esterification may be performed in presence of a solvent for the cellulose ester produced; acetic acid is particularly suitable in the case of manufacturing cellulose acetate but any other suitable solvents (or solvent mixtures) of the cellulose acetates or other cellulose esters may be employed. The acetic acid or equivalent solvent or solvent mixture may be present in any desired quantity, such as 4 to 6 times the weight of the cellulose or near conversion product, but cellulose acetates or other cellulose esters of especially high viscosity can be obtained if the acetic acid or equivalent solvent or solvent mixture is present in an amount greater than six times, for example 8 to 20 times or more the weight of the cellulose or conversion product as hereinafter referred to. Small quantities,—such for instance as ½ to 10% reckoned on the weight of the cellulose,—of more powerful organic solvents for cellulose acetates or the other cellulose esters, such for example as ethylidene diacetate, lactic acid or its acetyl derivatives, may be added to the acetic acid or other solvent or solvent mixture, as indicated in my U. S. Patent 1,711,111, issued April 30, 1929, or such more powerful solvents may be produced in the acetylation or esterification solution, for example by addition of acetaldehyde to produce ethylidene diacetate by reaction with the acetic anhydride in the case of producing cellulose acetates.

In a previous U. S. Patent 1,708,787, issued April 9, 1929 I have indicated that cellulose acetates of specially high viscosity characteristics can be obtained by conducting the acetylation in presence of acetic acid or equivalent solvents or solvent mixtures in an amount greater than six times, for example 8 to 20 times or more, the weight of the cellulose or cellulose conversion product used. With the present invention likewise the acetylation or esterification may with advantage, for the production of highly viscous cellulose acetates or other cellulose esters, be conducted in presence of similar large amounts of acetic acid or equivalent solvents or solvent mixtures, for example other fatty acids higher than acetic acid, or other suitable acids, or liquids such as chloroform, tetrachlorethane, or mixtures of such solvents or liquids.

Alternatively the acetylation or esterification may be performed in suspension in liquid diluents, such for example as benzene or toluene. The esterification in suspension may, for instance, be conducted on the lines indicated in my French Patent No. 432,046 and its patents of addition Nos. 15,933 and 16,316. If desired solvents, for example acetic acid, may be present in addition to the liquid diluents. Furthermore acetic acid or equivalent solvent may again be used in quantities over six times the weight of the cellulose, for example 8-20 times or more, to obtain cellulose esters of high viscosity as described in my U. S. Patent 1,708,787, issued April 9, 1929. In all such cases of using solvents in addition to liquid diluents, the liquid diluent should be present in sufficient quantity to prevent solution of the cellulose acetate or other cellulose ester produced.

As a further modification the esterification may be conducted substantially in absence of liquid solvents or diluents by employing vapours of acetic anhydride or other esterifying agent.

Fibres, fabrics or the like, for example of cotton or other natural cellulosic materials or of viscose artificial silk or of other regenerated cellulosic artificial fibres, may be acetylated or esterified by means of the present invention by carrying out the esterification either in suspension in presence of liquid diluents or substantially in absence of liquid solvents or diluents.

The following examples illustrate the invention but are not to be construed as in any way limiting it.

*Example 1*

100 parts of cotton cellulose are pretreated with formic acid, for example by treatment with 500 to 1000 parts or more of formic acid of about 85-100% strength, allowing to stand for some hours in the cold and hydro-extracting or by impregnating with about 15 parts of formic acid of 75-85% strength and then allowing to stand for about 8-12 hours at ordinary temperature. If desired the material may then be washed to remove the formic acid and centrifuged or dried. The 100 parts of pretreated material are introduced in the acetylator into a mixture of 600 parts of acetic anhydride, 600 parts of acetic acid and 20 parts of ferric chloride, and the mass is constantly mixed or stirred during the reaction, which is conducted at atmospheric temperature. The acetylation proceeds smoothly and a clear solution is obtained. The solution may either be utilized directly or the cellulose acetate precipitated and redissolved or worked up in any desired manner.

*Example 2*

Cotton cellulose is introduced into a mixture of

10–20 times its weight of formic acid of 85% strength and 10–20 times its weight of glacial acetic acid, is allowed to stand for some hours in the cold and is hydroextracted and dried. 100 parts of the pretreated material are introduced in the acetylator into a mixture of 800 parts of acetic acid, 300 parts of acetic anhydride and 30 parts of ferric chloride. The reaction is carried out in the cold with constant mixing or stirring. A water-clear solution is obtained of a cellulose acetate of very high viscosity.

Similarly ferric bromide or ferric iodide may be employed to effect the acetylation and furthermore by employing the appropriate anhydride or anhydrides other cellulose esters or mixed esters may be obtained. It is found that the present processes much facilitate the production of cellulose esters of higher fatty acids, e. g. propionic acid, as compared with prior processes.

The cellulose acetates or other cellulose esters resulting from acetylation or other esterification according to the invention may be used in their esterification solutions or in solutions of the primary esterification products for the production of artificial silks, films etc. or they may be subjected to secondary treatments or reactions for the purpose of changing their solubilities. The secondary treatments or reactions may be carried out in the primary esterification solutions or suspensions preferably without eliminating the ferric salt present and after destroying if necessary any remaining anhydride by the addition of water or other anhydride-destroying agents, (such for instance as hydroxyl derivatives, oxy acids, for instance lactic acids, alcohols etc.). If desired hydrochloric or other hydrohalide acid may be added to accelerate the reaction. Alternatively the esters either precipitated from the primary esterification solutions or those obtained other than in solution, may be dissolved or suspended and then subjected to the secondary treatments. The secondary treatments or reactions may be carried out with or without addition of inorganic or organic acids, acid salts or other suitable agents for promoting the secondary treatment or reaction, the treatment in any case being stopped when the required solubility has been reached. It is particularly advantageous to conduct the further treatments or reactions in the joint presence of hydrochloric acid and ferric chloride or other combined catalysts used according to my prior British patent application No. 25,637 of 1927 or the corresponding U. S. application No. 301,927, either in the primitive esterification solutions or suspensions or after separation therefrom. For the further treatments or reactions one should first destroy any remaining acetic anhydride or other esterifying anhydride that may remain in the esterification solution or suspension or in the primary ester, by adding water or other anhydride-destroying agents to the esterification solution or to the solutions or suspensions of the primary ester.

While the secondary or further treatments of the primary esterification products may with advantage be conducted at ordinary or moderate temperatures, one may if desired quicken the reaction by heating up to relatively high or high temperatures, even up to 80° or 100° C., but in such cases the presence of free mineral acids is preferably avoided.

The secondary or further treatments of the primary esterification products will be stopped when the particular solubility desired is reached.

To obtain acetone solubility it is in general unnecessary to carry the secondary or further treatments so far as hitherto and consequently the acidyl content of the acetone-soluble esters may be higher. This is probably the reason for the remarkable properties hereinafter referred to of the filaments and the like obtained from these esters.

An important advantage of the present invention is the fact that the cellulose acetates or other esters can be employed in their primary esterification solutions in their different stages or phases of acetylation or esterification, for the production of artificial silks and the like, films, celluloid-substitutes or other thermo-plastic masses, moulding powders or articles etc.

Further the invention permits of obtaining cellulose esters of high quality which are soluble in acetone or in very low boiling solvents, for instance methyl formate, acetaldehyde, formaldehyde etc. Also suitable high boiling solvents or plasticizing or softening agents can be readily incorporated with them or their solutions in volatile solvents and/or very low boiling solvents.

The new cellulose acetates or other esters, either in their primary esterification solutions and with or without secondary treatments or as primary or secondary esters in solution in suitable solvents, for example acetone, ethyl alcohol-acetone, methyl alcohol-acetone, or the very low boiling solvents referred to above or in mixtures of such solvents, may be employed for the production of artificial silks or fibres, films etc. For either wet or dry-spinning processes the esters may be employed in the form of solutions of relatively low concentration for instance 5–8% or of medium concentration, for example 10–20%, or of high concentration containing over 20%, e. g. 25–30% or more.

The artificial silks and the like produced from the new secondary esters of high ester content are found to be much more resistant to delustering by hot or boiling aqueous liquids or moist steam than the cellulose ester products produced hitherto, and they may even resist delustering altogether.

As examples of suitable precipitating liquids for use in wet-spinning processes the following may be mentioned:—alcohols, for example methyl and ethyl alcohols and their homologues; coal tar, petroleum or other hydrocarbons, for instance benzene, toluene and their homologues, gasoline, kerosene and the like; and aqueous liquids containing, for example, suitable proportions of mineral acids, e. g. sulphuric acid, of acid salts, e. g. bisulphates, of neutral salts, e. g. sodium, potassium, calcium or magnesium chloride, or, as described in prior British Specifications Nos. 177,868 and 179,234, of thiocyanates, zinc chloride, acetone, diacetone alcohol, alcohol, acetic acid, formic acid or other salts or substances having a latent solvent power for the cellulose acetate or other ester. Furthermore, such precipitating liquids may, if desired, be incorporated in suitable proportions in the spinning solutions prior to extrusion.

For the production of artificial silks or fibres, films etc. as well as for the production of thermo-plastic masses, articles and the like, plasticizing or softening agents or high boiling solvents may be incorporated in the esters or in their solutions.

For the dry-spinning of artificial silks or fibres, the apparatus described in prior U. S. Patent No. 1,601,125, U. S. patent application Serial No.

615,682, filed 29th January 1923, U. S. Patent No. 1,541,104, U. S. patent application Serial No. 236,448, filed 29th November 1927, British applications Nos. 28,193/27 or 28,194/27 or any other suitable apparatus may be employed. Again for the wet-spinning processes any suitable apparatus may be used, for example apparatus of the type employed in the spinning of viscose, cuprammonium and nitro-cellulose artificial silks.

What I claim and desire to secure by Letters Patent is:—

1. Process for the production of cellulose esters, comprising pretreating materials consisting substantially of cellulose with lower aliphatic acids and esterifying them by means of fatty acid anhydrides in presence of ferric halide as sole catalyst.

2. Process for the production of cellulose esters, comprising pretreating materials consisting substantially of cellulose with lower aliphatic acids and esterifying them by means of fatty acid anhydrides in presence of ferric chloride as sole catalyst 3. Process for the production of cellulose esters, comprising pretreating materials consisting substantially of cellulose with lower aliphatic acids and esterifying them by means of fatty acid anhydrides in presence of ferric chloride as sole catalyst in a proportion of at least 5% of the weight of the cellulose 4. Process for the production of cellulose acetate, comprising pretreating materials consisting substantially of cellulose with lower aliphatic acids and acetylating them by means of acetic anhydride in presence of ferric chloride as sole catalyst.

5. Process for the production of cellulose acetate, comprising pretreating materials consisting substantially of cellulose with lower aliphatic acids and acetylating them by means of acetic anhydride in presence of ferric chloride as sole catalyst in a proportion of at least 5% of the weight of the cellulose.

6. Process for the production of cellulose acetate, comprising pretreating materials consisting substantially of cellulose with lower aliphatic acids and acetylating them by means of acetic anhydride in presence of ferric chloride as sole catalyst in a proportion of 10–30% of the weight of the cellulose.

7. Process for the production of cellulose acetate, comprising pretreating materials consisting substantially of cellulose with lower aliphatic acids and acetlylating them at temperatures up to 50° C. by means of acetic anhydride in presence of ferric chloride as sole catalyst and in presence of a solvent for the acetate produced.

8. Process for the production of cellulose acetate, comprising pretreating materials consisting substantially of cellulose with lower aliphatic acids and acetylating them at temperatures up to 50° C. by means of acetic anhydride in presence of ferric chloride as sole catalyst in a proportion of 10–30% of the weight of the cellulose and in presence of a solvent for the acetate produced.

9. Process for the production of cellulose acetate, comprising pretreating materials consisting substantially of cellulose with formic acid and thereafter acetylating them at temperatures up to 50° C. by means of acetic anhydride in presence of ferric chloride as sole catalyst in a proportion of 10–30% of the weight of the cellulose and in presence of a solvent for the acetate produced in quantity at least six times the weight of the cellulose.

10. Process for the production of cellulose esters, comprising pretreating materials consisting substantially of cellulose with lower aliphatic acids and esterifying them by means of fatty acid anhydrides in presence of ferric halide as sole catalyst and then subjecting the esters produced to secondary treatments for the purpose of changing their solubilities.

11. Process for the production of cellulose acetate, comprising pretreating materials consisting substantially of cellulose with lower aliphatic acids and acetylating them by means of acetic anhydride in presence of ferric chloride as sole catalyst in a proportion of at least 5% of the weight of the cellulose and then subjecting the acetate produced to secondary treatments for the purpose of changing its solubilities.

12. Process for the production of cellulose acetate, comprising pretreating materials consisting substantially of cellulose with lower aliphatic acids and acetylating them at temperatures up to 50° C. by means of acetic anhydride in presence of ferric chloride as sole catalyst and in presence of a solvent for the acetate produced and then subjecting the acetate produced to secondary treatments for the purpose of changing its solubilities.

13. Cellulose esters produced in presence of ferric halide as sole catalyst from lower aliphatic acid pretreated cellulose.

14. Cellulose acetates produced in presence of ferric chloride as sole catalyst from lower aliphatic acid pretreated cellulose.

15. Industrial products comprising cellulose esters produced in presence of ferric halide as sole catalyst from lower aliphatic acid pretreated cellulose.

16. Industrial products comprising cellulose acetates produced in presence of ferric chloride as sole catalyst from lower aliphatic acid pretreated cellulose.

HENRY DREYFUS.